Aug. 2, 1938.    A. F. MILLER    2,125,848

CUP MAKING MACHINE

Original Filed Sept. 13, 1935    3 Sheets-Sheet 1

WITNESS
G. V. Rasmussen

INVENTOR
ALBERT F. MILLER
BY
ATTORNEYS

Aug. 2, 1938.   A. F. MILLER   2,125,848
CUP MAKING MACHINE
Original Filed Sept. 13, 1935   3 Sheets-Sheet 2
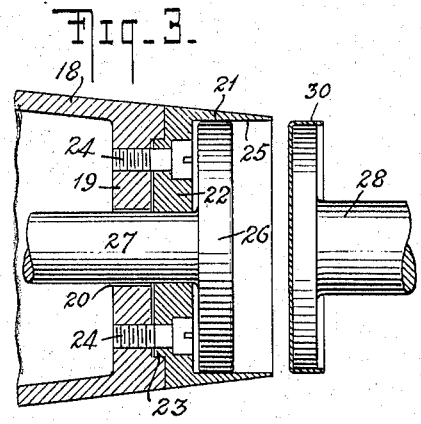
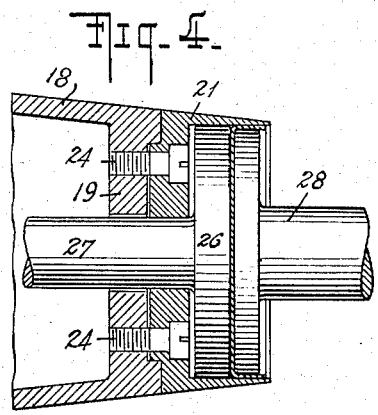
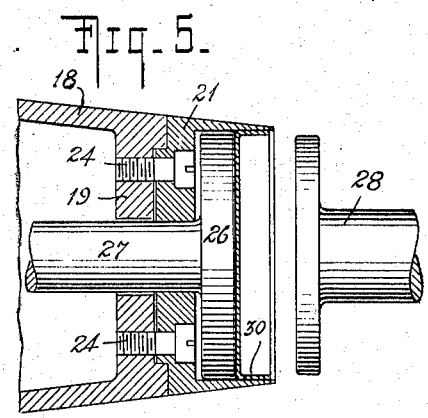
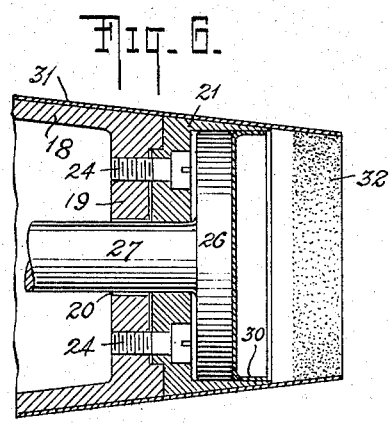
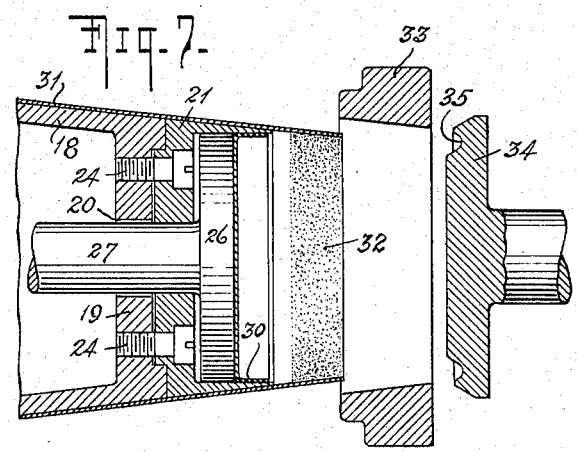
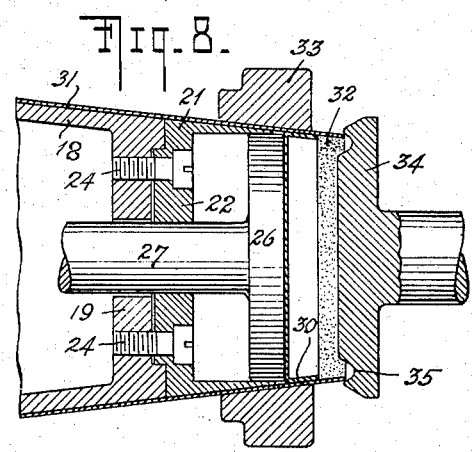
WITNESS
G. V. Rasmussen
INVENTOR
ALBERT F. MILLER
BY
ATTORNEYS Aug. 2, 1938.     A. F. MILLER     2,125,848
CUP MAKING MACHINE
Original Filed Sept. 13, 1935    3 Sheets-Sheet 3
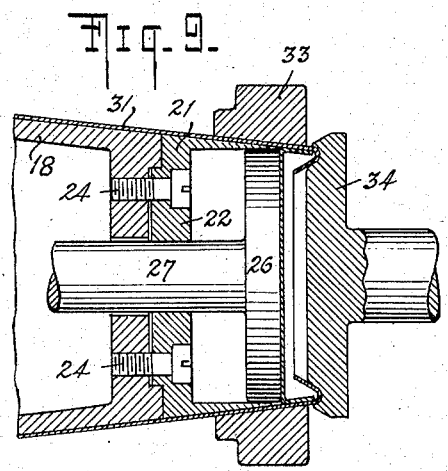
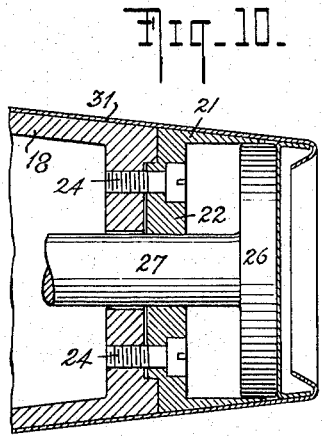
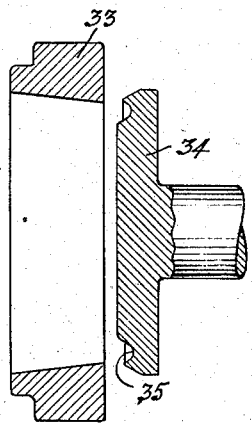
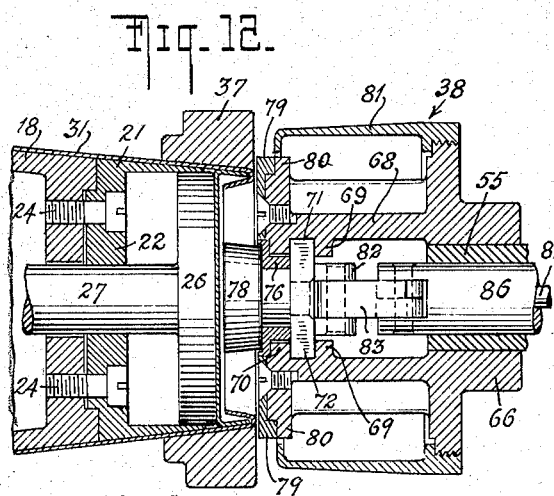
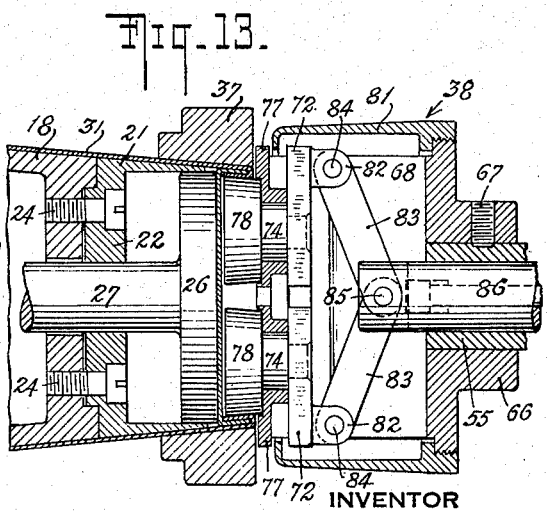
INVENTOR
ALBERT F. MILLER
BY
ATTORNEYS Patented Aug. 2, 1938

2,125,848

UNITED STATES PATENT OFFICE 2,125,848

CUP MAKING MACHINE

Albert F. Miller, Flushing, N. Y., assignor to Lily-Tulip Cup Corporation, New York, N. Y., a corporation of Delaware Application September 13, 1935, Serial No. 40,362
Renewed July 2, 1937

12 Claims. (Cl. 93—36.5)

This invention relates to that class of machines which are employed for making cups for drinking and similar purposes from light, thin material, as for instance, paper, and has for its object to improve such machines generally and particularly to provide a machine of the indicated type in which the bottoming mechanism for fixing the bottoms in the cups shall be relatively simple and sturdy in construction and positive, rapid and efficient in operation.

Figure 1:
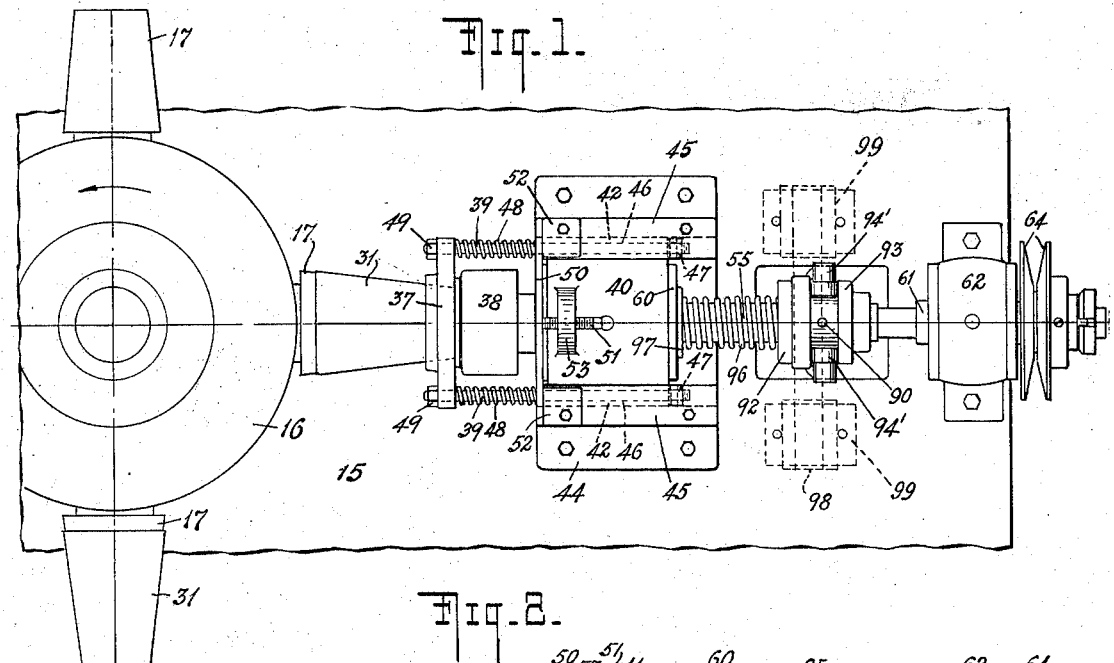
Figure 2:
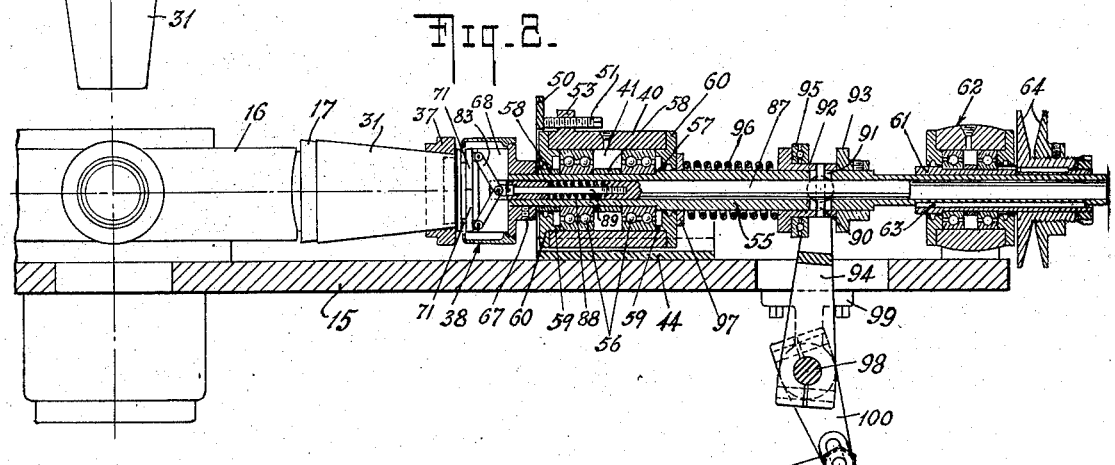
Figure 14:
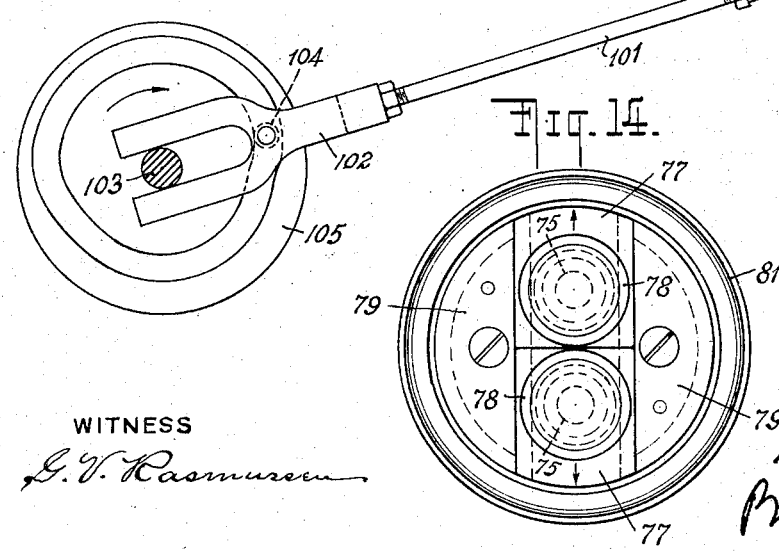

Other objects and advantages of the invention will become apparent after a consideration of the following detailed description taken in connection with the accompanying drawings in which Fig. 1 is a plan view of a portion of my improved cup making machine showing the position of the bottoming mechanism prior to its completion of the bottoming operation; Fig. 2 is a central vertical section of the bottoming mechanism shown in Fig. 1 with a portion of the turret shown in outline; Fig. 3 is an enlarged view of the outer end portion of a mandrel, partially in section, and the bottom inserting plunger illustrating the manner of applying cup bottoms to the mandrel; Fig. 4 is a similar view showing the bottom inserted in place in the outer end of the mandrel; Fig. 5 is a similar view showing the position of the elements as the bottom conveying plunger is being withdrawn; Fig. 6 is a similar view of a mandrel showing a cup body applied thereto; Fig. 7 is a view similar to Fig. 6 but illustrating in addition the position of the clamping ring and the die of the bottom curling mechanism prior to its engagement with the cup body; Fig. 8 is a similar view showing the clamping ring in position on the cup body and the curling die in position to engage the outer edge of the cup body; Fig. 9 is a similar view illustrating the inturning of the bottom edge of the cup body to enclose the flange on the cup bottom; Fig. 10 is another similar view showing the curling member and clamping collar withdrawn to enable the mandrel to move to the bottom finishing station; Fig. 11 is a similar view illustrating the position of a mandrel with the cup body and cup bottom thereon just before the final operation of securing the bottom in place; Fig. 12 is a similar view showing the position of the squeeze or rolling mechanism prior to its operation, the clamping collar being in position on the cup body; Fig. 13 illustrates the manner of finally securing the bottom in place and Fig. 14 is a face view of the head containing the squeeze mechanism.

Referring more particularly to the drawings, the reference character 15 designates a table which is supported by the frame of the machine and on which is rotatably mounted a turret 16 having mandrels 17 projecting radially from its sides which are adapted to receive cup bodies thereon and bottoms within the ends thereof, in a manner to be hereinafter described. A step-by-step rotating movement is imparted to the turret by a Geneva mechanism (not shown) in a manner common to mechanism of this type and which will be readily understood by those skilled in the art without further detailed explanation herein.

Each of the mandrels 17 comprises a hollow body portion 18 shaped like the frustum of a cone and having an outer end wall 19 provided with a centrally disposed aperture 20. Supported on the outer end of the body portion 18 is a hollow section 21 having a frusto-conically shaped outer surface which forms a continuation of the conical surface of the body portion 18 and a cylindrically formed inner surface 25, as shown in Figs. 3 to 5. The section 21 has an inner end wall 22 provided with a projecting portion 23 adapted to seat in a similarly shaped recess formed in the end wall 19 of the hollow body portion, said wall 22 and projecting portion 23 having a centrally disposed aperture therethrough which is in alignment with the aperture 20 in the wall 19. The section 21 is securely mounted on the body portion 18 by means of the bolts 24 which extend through the end wall 23 and are threadedly engaged with the end wall 19. Located in the recess provided in said section 21 is an ejector 26 integral with the outer end of an ejector rod 27, said rod extending through the aligned apertures in the walls 19 and 22, through the hollow body portion 18 of the mandrel and into the turret where it is connected with suitable mechanism (not shown) adapted to move said rod in the direction of its axis at predetermined intervals in the operation of the machine. Mechanism for accomplishing this operation is well known to those skilled in the art and may comprise an ejecting finger provided at the inner end of the ejector stem which is operated by an ejector cam along which the finger sweeps as the turret is rotated.

In the operation of the machine, a cup is formed on a mandrel 17 by first inserting a cup bottom in the recessed section 21 thereof. This is accomplished at one of the stations to which the turret brings the mandrel during its step-by-step operation by means of a cup inserting plunger 28 which is operated in any suitable manner, further explanation of which is omitted as it is not necessary to a full understanding of the invention. As shown in Fig. 3, the head of the plunger 28 carries the cup bottom which is provided with an annular flange 30, to the end of the mandrel, then forces it into the recess of section 21 against the outer face of the ejector 26 so that the flange of the cup bottom is entirely contained within the recess (see Fig. 4) and then withdraws, leaving the cup bottom in the recess as shown in Fig. 5.

The turret is then rotated to the next station (not shown) at which a body blank which has previously been provided with a line of paste along one longitudinal edge and along the edge which is to form the bottom end portion of the cup, is wrapped around the mandrel by mechanism not necessary to be described herein so that the bottom end portion thereof projects beyond the outer end of the mandrel and the longitudinal edges of the body blank are stuck together to form a cup body. As will be seen in Fig. 6, the position of the cup body 31 on the mandrel after these operations is such that the line of glue 32 which is provided on the inner surface of the bottom edge portion of the cup body and which is approximately twice as wide as the flange on the cup bottom, is spaced a slight distance from the outer end of the mandrel. Up to this point the ejector 26 remains in the bottom of the recess, as shown in Figs. 3 to 6.

When the turret comes to rest after the next one-step movement thereof to the third station, a clamping collar 33 for the cup body and a curling member 34 move toward the outer end of the mandrel (see Fig. 7). The clamping collar 33 moves into contact with the cup body to clamp the latter securely in place before the lip-forming die of the curling member 34 comes into contact with the projecting edge of the cup body, as shown in Fig. 8. At the same time the mechanism for operating the ejector rod 27 causes such rod and the ejector 26 to move outwardly and locate the cup bottom in position for assembly with the cup body. As shown in Fig. 8, this operation places the cup bottom slightly beyond the outer edge of the recessed section 21 so that the flange 30 of the cup is entirely surrounded by the inner half portion of the annular glue band 32. The ejector 26 is retained in this position during the curling operation at this station. Immediately following the engagement of the clamping ring 33 with the projecting edge portion of the cup body, the curling member 34 engages with the outer end of the cup body, the latter entering a groove 35 in the face of the member 34, which turns a lip on the end of the cup body around the flange of the cup bottom as the member 34 is moved towards the mandrel, as shown in Fig. 9. In this operation, the curling member 34 may be rotated by any suitable means in order to turn the lip rapidly and efficiently. After the lip has been turned on the bottom edge of the cup body so that the flange of the cup bottom is enclosed within said lip, the members 33 and 34 are withdrawn by the mechanism which advanced them, as shown in Fig. 10, thereby enabling the mandrel, in the next rotation of the turret, to be located at the next station where the bottoming operation is completed.

Immediately following the location of the mandrel at this station, a clamp 37 and a spinner head which is designated generally by the numeral 38 are moved toward the outer end of the mandrel, the spinner head 38 following the clamp 37, as shown in Fig. 11, so that the latter element is in contact with the cup body to clamp the same securely in place on the mandrel before the spinner head moves into contact with the bottom edge of the cup body. As shown more clearly in Fig. 1, the clamp 37 is supported on the outer ends of two rods 39 carried by a sliding block 40. The block 40 has a large circular passage or bore 41 extending longitudinally thereof and is provided with side flanges 42 which are slidably supported on two shoulders provided on the interior side walls of a guide 44 so that the bottom surface of the sliding block 40 is spaced from the guide, as shown in Fig. 2. The sliding block 40 is held in sliding contact with the guide 44 by the plates 45 which are bolted to the top surfaces of the side walls on the guide 44 and engage with the top surfaces of the flanges 42. The guide 44 which has a length approximately equal to the length of the sliding block plus the length of the stroke through which the sliding block is moved, is mounted on and secured to the table 15 in any suitable manner. The side flanges 42 of the sliding block each have a bore 46 extending lengthwise thereof and adapted to slidably receive a rod 39 which is provided on its inner end with a head or nut 47. The nuts 47 function as stops against the adjacent end walls of the flanges to retain the rods in position in the bores when the mechanism is withdrawn from the mandrel against the tension of the springs 48 which are carried on the projecting portion of the rods between the clamp 37 and the approximate ends of the flanges 42. The tension on the springs 48 may be varied by adjusting the nuts 47 or the nuts 49 threaded on the outer projecting ends of the rods 39.

Mounted on the end of the guide 44 adjacent to the spinner head 38 is a vertically disposed cross plate 50 which cooperates with a set screw 51 to limit the forward stroke of the sliding block 40. As shown in Fig. 1, the cross plate or stop 50 is provided with two integrally formed wings 52 which are supported on the top surfaces of the plates 45 and to which they are fixedly secured by bolts. The set screw 51 extends through a threaded aperture provided in an upwardly projecting portion 53 formed integrally with the top surface of the sliding block 40. It will be seen that with this arrangement the length of the stroke of the sliding block 40 can be varied by adjusting the set screw 51. Preferably the length of the stroke of the sliding block is such that the outer surface of the spinner head 38 just clears the bottom edge of the cup body when the spinners are inserted into the flanged bottom end thereof.

The forward end portion of a sleeve 55 is rotatably supported in the sliding block 40 by the roller bearings 56, as shown more clearly in Fig. 2. The inner race rings for the bearings which are in contact with the outer surface of the sleeve 55, are maintained in position on the block 40 by the shoulder 57 formed by the thickened central portion of the sleeve and the spacers 58. The outer race rings for the bearings which are in engagement with the inner surface of the sliding block 40, are maintained in position by the inwardly projecting stops 59 provided on the end plates 60 which are bolted to the sliding block 40. The rear end portion of the sleeve 55 is supported in a sleeve 61 which is rotatably supported by a bearing fixedly secured on the table 15 by bolts and designated generally by the reference character 62. As shown in Fig. 2, the rear end portion of the sleeve 55 has integrally formed therewith a key 63 which is slidably seated in a longitudinally extending slot formed on the interior surface of the sleeve 61. With this arrangement the sleeve 55 is enabled to slidably move within the sleeve 61 while rotational movement may be imparted by the latter to the sleeve 55 through the key 63. A sheave 64 is keyed to the projecting end portion of the sleeve 61 for rotating the same. The sheave 64 may be driven by means of belts from any suitable source of power which may be, if desired, an electric motor independent of the driving mechanism of the cup making machine.

The spinner head 38 is mounted on the forward end portion of the sleeve 55 which projects from the sliding block 40 and includes a flanged hub section 66 which is fixedly attached to the sleeve 55 by a set screw 67 so that it is rotatable therewith. As shown more clearly in Figs. 11 to 13, the hub section 66 has integrally formed therewith two walls or guide sections 68 which are disposed on opposite sides of the aperture in the hub section and project forwardly in parallel relation, said sections also extending across the spinner head to approximately the outer edge of the flanged portion of the hub section 66. Each of the guide sections 68 is provided on its outer end portion with two inwardly extending spaced flanges 69 and 70 which form an inner groove or recess 71 extending at right angles to the axis of the spinner head. Supported in the recesses 71 between the flanges 69 and 70 of the guide sections are a pair of slides 72 mounted for radial movement in the spinner head. Each of the slides 72 is provided with a stud shaft or arbor 73 which projects outwardly from the slide, the projecting portion of which comprises an enlarged intermediate section 74 and an end section 75. Mounted on the enlarged section 74 of each arbor 73 is a bearing plate which comprises a sleeve 76 encircling the section 74 and provided at its outer end with an outwardly extending flange 77 which seats against the outer side surfaces of the flanges 70. The end section 75 of each arbor bears an outwardly tapered spinner 78 consisting of an inner race frictionally held on the section 75 and a tapered outer race between which are confined a plurality of ball bearings, as shown more clearly in Fig. 11. The outer surfaces of the bearing plates are provided with circular recesses for receiving the inner ends of the spinners 78. A pair of face plates 79 are secured to the outer surfaces of the outwardly extending flanges 80 provided on the outer ends of the guide sections 68, the inner edges of such plates lying flush with the inner surfaces of such guide sections and together therewith forming a guideway for the bearing plates. A housing 81 is secured onto the flanged portion of the hub section 66, the outer free edge of said housing being turned inwardly just short of the inner surface of the flange 77 on the sleeve 76.

The slides 72 are each provided with a pair of spaced supporting brackets or lugs 82 positioned on the oppositely disposed outer end portions of the inner surfaces of the slides and between which is secured one end of a connecting link 83 by means of a pin 84. The other ends of the links 83 are connected by a pin 85 to the outer end of a slide actuator 86 contained within the forwardly projecting portion of the sleeve 55. Located within the sleeve 55 intermediate the slide actuator 86 and a plunger 87 is a spring 88 which presses the actuator 86 forwardly when the plunger is moved in the same direction thereby causing the connecting levers to move the slides outwardly in a radial direction. The spring 88 is mounted on a bolt 89 which is threaded at its inner end in the forward end portion of the plunger 87 and extends forwardly through an axial bore provided in the actuator 86, the head of said bolt being positioned within a recess provided on the outer end of the actuator 86 (see Figs. 2, 11 and 13).

The plunger 87 extends within the sleeve 55 to a point beyond the enlarged central portion of the sleeve 55 and at a point within the region of such enlarged portion is provided with a pin 90, the outer ends of which extend through the oppositely disposed slots 91 provided in the wall of the enlarged portion of the sleeve 55 and into an actuating head. The actuating head comprises a sleeve 92 with which the ends of the pin 90 engage and which is provided with an outwardly extending flange on its forward end and a flanged collar 93 fixedly secured to the sleeve 55 by a set screw. The flanges on the sleeve 92 and collar 93 form an annular groove within which is located the rollers 94' provided on the forked end of an actuating lever 94. A thrust bearing unit 95 is positioned in such groove intermediate the rollers 94' and the flange on the sleeve 92 and bears against the latter. A compression spring 96 is located on the enlarged portion of the sleeve 55, one end of the spring resting against the flanged end of the sleeve 92 and the opposite end of said spring resting against a washer 97 seated against the inner plate 60 of the slide block 40. The actuating lever 94 is secured to a shaft 98 which is mounted in the bearing brackets 99 secured to the underside of and projecting downwardly from the table 15. An arm 100 secured to the shaft 98 projects downwardly therefrom and is secured at its lower end to one end of an actuating rod 101. Secured to the other end of the actuating rod 101 is a forked member 102 which straddles the driving shaft 103 of the machine and is provided with a roller 104 which engages within a groove in a cam 105 secured to the shaft 103.

It will be seen from the above description, that when the shaft 103 and cam 105 are rotating in the direction indicated in Fig. 2, the actuating lever 94 is rocked by operation of the cam 105, roller 104, rod 101, arm 100 and shaft 98. As the upper end of the lever 94 is moved forward, it moves the sleeve 55 and all the parts mounted thereon forward causing the clamp 37 to engage with the cup body mounted on the mandrel as shown in Fig. 2. As the sleeve 55 continues its forward movement the springs 48 on the rods 39 are compressed and the rods 39 slide within the bores 46 in the flanges 42 of the slide block 40 thus preventing any further forward movement of the clamp 37. When the set screw 51 on the slide block 40 engages with the stop 50, further forward movement of the block 40 and the sleeve 55 is prevented. In this position of the parts the spinners 78 have entered into the recess in the bottom of the paper cup on the mandrel and are in a position to perform the bottom finishing operation, as shown in Fig. 12 of the drawings. Action of the lever 94 now forces the sleeve 92 of the actuating head and the plunger 87 forwardly against the tension of the spring 96. The forward movement of the plunger 87 pushes the spring 88 and slide actuator 86 forwardly causing the links 83 to push the slides 72 outwardly in opposite directions. The outwardly moving slides 72 move the spinners 78 into contact with the inturned lip on the cup body and force such lip into contact with the flange on the cup bottom, as shown in Fig. 13. As the above operations are being carried out the sleeve 55 is being constantly rotated by the driven sheave 64, whereby the spinners 78 are rotated about the axis of the plunger 87. Thus when the spinners 78 are moved into contact with the inturned lip of the cup body, they roll the latter tightly against the flange of the cup bottom, securing the latter firmly in place between such lip and the lower end portion of the cup body. In these operations the spring 88 acts as a cushioning element, being capable of being compressed to an extent equal to the distance between the inner wall of the recess in the end of the slide actuator 89 and the inner ends of the links 83. When the bottoming operation is completed the lever 94 is retracted and the parts move back to their normal positions. The turret is then enabled to bring a new mandrel with a cup body and bottom thereon into position for another operation of the mechanism just described, the thus finished cups being discharged intermediate this station and the station where the cup bottom is inserted into the end of the mandrel. It will be noted that this operation has three phases during the continued forward movement of the actuating lever 94, first, the clamp is moved into position and then prevented from any further forward movement, then the spinners 78 are properly positioned within the recess in the bottom of the cup body, any further movement of the block 40, sleeve 55 and connecting parts being prevented by the set screw 51 and stop 50 and thirdly the spinners are caused to spread apart so that they come into contact with the inturned lip on the cup body to force the same tightly against the flange of the cup bottom during the rotational movement of the spinners.

I claim:

1. In a machine for making paper or like containers, the combination of a support adapted to hold a container body with one of its ends projecting therefrom, and mechanism for turning in said projecting edge, said mechanism comprising a spinner head, slides mounted for lateral movement on said head, spinners mounted on said slides, a hollow shaft supporting said head, a slide actuator carried within said shaft, a plurality of links operatively connecting said slide actuator with said slides, means for reciprocating said shaft toward and away from the mandrel, a yieldable member operatively connected with said slide actuator and said reciprocating means and operable by the latter to move said slide actuator towards said mandrel, thereby causing said links to move said slides outwardly, a rigid member operatively connected with said slide actuator and said reciprocating means and operable by the latter to positively withdraw said slide actuator from its outer position, thereby causing said links to move said slides inwardly and means for rotating said hollow shaft.

2. In a machine for making paper or like containers, the combination of a support adapted to hold a container body with one of its ends projecting therefrom, and mechanism for turning in said projecting edge, said mechanism comprising a spinner head, slides mounted for lateral movement on said head, spinners mounted on said slides, a hollow shaft supporting said head, means for rotating said shaft, a plunger carried within said hollow shaft, means for reciprocating said shaft and plunger toward and away from the mandrel, a slide actuator yieldably connected to one end of said plunger, a plurality of links connecting said slide actuator with said slides and operable to move said slides outwardly when said slide actuator is moved toward the mandrel during the forward stroke of the plunger and a rigid member secured to said plunger and operatively connected with said slide actuator and operable by said plunger to positively withdraw the said slide actuator from its outer position, thereby causing said links to move said slides inwardly.

3. In a machine for making paper or like containers, the combination of a support adapted to hold a container body with one of its ends projecting therefrom, and mechanism for turning in said projecting edge, said mechanism comprising a spinner head, slides mounted for lateral movement on said head, spinners mounted on said slides, a hollow shaft supporting said head, means for rotating said shaft, a plunger carried within said hollow shaft, a slide actuator carried within said hollow shaft in spaced relation to said plunger, a plurality of links operatively connecting said slide actuator with said slides, means for reciprocating said shaft and plunger toward and away from the mandrel, a spring disposed between said slide actuator and said plunger and operable to move said slide actuator toward said mandrel during the forward stroke of the plunger, thereby causing said links to move the spinners carried by said slides into engagement with the bottom of the cup and a rigid member secured to said plunger and operatively connected with said slide actuator and operable on the backward stroke of said plunger to positively withdraw said slide actuator from its outward position, thereby causing said links to move the spinners carried by said slides out of engagement with the bottom of the cup.

4. In a machine for making paper or like containers, the combination of a support adapted to hold a container body with one of its ends projecting therefrom, and mechanism for turning in said projecting edge, said mechanism comprising a spinner head having a plurality of spinners mounted thereon, a hollow shaft supporting said head, means for slidably and rotatably supporting said shaft at its ends, means adapted to impart rotational movement to said shaft while enabling it to slidably move with respect thereto, actuating means carried within said shaft, a plurality of links operatively connecting said actuating means with the spinners in said spinner head, means positioned intermediate the ends of said shaft for reciprocating said shaft and actuating means toward and away from the mandrel, means to limit the movement of said shaft towards said mandrel and means for giving said actuating means an additional movement towards said mandrel after the shaft has stopped its movement in that direction to cause the links to move the spinners carried by said slides outwardly into tight engagement with the inner sides of the bottom portion of the cup, said actuating means being so constructed and arranged with relation to said links as to cause said spinners to yieldingly engage the cup in the forward stroke thereof and to positively bring said spinners out of engagement with the cup on its backward stroke.

5. In a machine for making paper or like containers, the combination of a support adapted to hold a contained body with one of its ends projecting therefrom, and mechanism for turning in said projecting edge, said mechanism comprising a spinner head having a plurality of spinners mounted thereon, a hollow shaft for supporting said spinner head, a slide for supporting one end of said shaft, means between said slide and said shaft enabling the latter to rotate freely on said slide, an adjustable stop adapted to limit the movement of said slide towards said mandrel, means at the other end of said shaft adapted to impart rotational movement to said shaft while enabling the latter to move slidably with respect thereto, actuating means carried within said shaft, means operatively connecting said actuating means with the spinners on said spinner head and adapted to cause said spinners to yieldingly engage with the bottom edge of the cup body when the actuating means is at the end of its stroke forward, and to positively bring said spinners out of engagement with the cup during the backward stroke of said actuating means and means positioned intermediate the ends of said shaft for moving said shaft and said actuating means towards the mandrel, said means being also adapted to give said actuating means an additional movement towards said mandrel after the shaft has stopped its forward movement.

6. In a machine for making paper or like containers, the combination of a support adapted to hold a container body with one of its ends projecting therefrom, and mechanism for turning in said projecting edge, said mechanism comprising a spinner head, a plurality of spinners mounted for lateral movement on said head, a plurality of actuating links connected at one end to said spinners, a hollow shaft for supporting said spinner head, a slide for supporting said shaft, connecting means between said slide and said shaft enabling the latter to rotate freely on said slide, means for limiting the movement of said slide towards said mandrel, means adapted to impart rotational movement to said shaft while enabling the latter to move slidably with respect thereto, a plunger positioned within said hollow shaft, means operatively connecting said plunger with the other ends of said links and operable to cause said links to move the spinners outwardly into yielding engagement with the inner sides of the bottom portion of the cup during the forward movement of said plunger towards the spinner head and to positively bring said spinners out of engagement with the cup on the backward stroke of the plunger and means adapted to move said rotating shaft and said plunger towards the mandrel on which the cup body and bottom is supported, said means being adapted to give said plunger an additional movement towards said mandrel after the shaft has stopped its forward movement.

7. In a machine for making paper or like containers, the combination of a support adapted to hold a container body with one of its ends projecting therefrom, and mechanism for turning in said projecting edge, said mechanism comprising a spinner head having a plurality of spinners mounted thereon, a hollow shaft for supporting said spinner head, a slide for supporting the end of said shaft on which said spinner head is mounted, connecting means between said slide and said shaft enabling the latter to rotate freely on the slide, means for limiting the movement of said slide towards said mandrel, a sleeve positioned on the other end of said shaft, a bearing supporting said shaft and sleeve, means for imparting rotational movement to said sleeve, means connecting said sleeve and shaft for imparting the rotational movement of the sleeve to said shaft, said connecting means being also adapted to enable said shaft to slidably move within said sleeve, a plunger positioned within said hollow shaft, means carried within said hollow shaft for operatively connecting said plunger with the spinners in said spinner head and adapted to cause said spinners to yieldingly engage with the bottom edge of the cup body when the plunger is moved towards said spinner head and to positively bring said spinners out of engagement with the cup during the backward stroke of said plunger, and means adapted to move said shaft and plunger as a unit towards said mandrel, said means being adapted to impart further movement to said plunger when the shaft has stopped its forward motion.

8. In a machine for making paper or like containers, mechanism for turning in an end of a container body comprising, a spinner head, a plurality of spinners mounted for movement in said head, reciprocating means, means operatively connecting said spinners with said reciprocating means, said connecting means including a spring element arranged to cause said spinners to yieldingly engage with the container body during one portion of the stroke of said reciprocating means and a rigid element arranged to control said spring element and to positively bring said spinners out of engagement with the container body at another portion of the stroke of said reciprocating means, and means for rotating said spinners.

9. In a machine for making paper or like containers, a mechanism such as is defined in claim 8, in which said connecting means comprises an actuating member and a plurality of independent members each connected to a spinner and pivotally connected to said actuating member and being adapted as the spinners move outwardly toward the container body to separate at the ends opposite said pivotal connection and to approach each other as the spinners are moved away from the container body.

10. In a machine for making paper or like containers, the combination of a support adapted to hold a container body with one of its ends projecting therefrom and mechanism for turning in the said projecting end of the container body, said mechanism including a spinner head having a spinner mounted for lateral movement thereon, a support for the spinner head, an actuating member, means operatively connecting said actuating member with said spinner, means for reciprocating said actuating member, a yieldable member operatively connecting said actuating member with said reciprocating means and operable by the latter to move the actuating member towards the support, thereby causing said connecting means to move said spinner laterally in the spinner head outwardly towards the interior surface of the container body, a rigid member operatively connecting said actuating member with said reciprocating means and operable by the latter to positively withdraw the actuating member from its outer portion thereby causing said connecting means to move said spinner inwardly away from said container body, and means for rotating the spinners.

11. In a machine for making paper or like containers, a device for bending the lower edge of the body inwardly with respect to the container body, comprising a spinner head, a plurality of spinners supported with respect to said head, means for actuating said spinners, a plurality of independent members, each connected with a spinner and pivotally connected with said actuating means, said independent members during movement toward the container body being adapted to move further apart at their ends opposite said pivotal connection and to approach each other as the spinners move away from the container body.

12. In a machine for making paper or like containers, the combination of a support adapted to hold a container body with one of its ends projecting therefrom, means for turning in the edge of said projecting end, revolvable means for pressing said turned edge towards the body of the cup, means for yieldably forcing said revolvable means outwardly to cause such pressing action and rigid means for positively withdrawing said revolvable means after the pressing operation.

ALBERT F. MILLER.